US011273802B2

(12) United States Patent
Hanker et al.

(10) Patent No.: US 11,273,802 B2
(45) Date of Patent: Mar. 15, 2022

(54) ARRANGEMENT OF A PARKING LOCK IN A VEHICULAR TRANSMISSION

(71) Applicant: ZF Friedrichshafen AG, Friedrichshafen (DE)

(72) Inventors: Gert Hanker, Meckenbeuren (DE); Christian Michel, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 136 days.

(21) Appl. No.: 16/518,101

(22) Filed: Jul. 22, 2019

(65) Prior Publication Data

US 2020/0023818 A1 Jan. 23, 2020

(30) Foreign Application Priority Data

Jul. 23, 2018 (DE) ...................... 10 2018 212 189.3

(51) Int. Cl.
*F16H 63/34* (2006.01)
*B60T 7/04* (2006.01)
*B60T 8/32* (2006.01)

(52) U.S. Cl.
CPC ............ *B60T 7/045* (2013.01); *B60T 8/3215* (2013.01); *F16H 63/3433* (2013.01); *F16H 63/3441* (2013.01)

(58) Field of Classification Search
CPC ............ F16H 63/3416; F16H 63/3433; F16H 63/3483; F16H 57/021; F16H 2057/0216; F16H 63/3441
See application file for complete search history.

(56) References Cited

U.S. PATENT DOCUMENTS

| 4,679,450 A * | 7/1987 | Hayakawa ......... | B60K 23/0808 475/119 |
| 6,481,556 B1 * | 11/2002 | Haupt ................. | F16H 63/3491 192/219.5 |
| 6,692,394 B2 * | 2/2004 | Takenaka ............ | F16H 63/3416 475/5 |
| 7,490,528 B2 * | 2/2009 | Koski ..................... | F16H 59/08 192/219.5 |
| 7,757,832 B2 * | 7/2010 | Sauter ................. | F16H 63/3416 192/219.5 |
| 8,905,881 B2 * | 12/2014 | Sada ....................... | F16H 3/727 475/5 |
| 2011/0011204 A1* | 1/2011 | Ueno ...................... | F16H 63/48 74/606 R |
| 2017/0138474 A1* | 5/2017 | Nomura .............. | F16H 63/3425 |
| 2020/0108706 A1* | 4/2020 | Devreese ................ | F16H 37/08 |

FOREIGN PATENT DOCUMENTS

| DE | 10021176 A1 * | 11/2001 | ......... F16H 63/3416 |
| DE | 102016101486 | 8/2017 | |
| JP | 04063750 A * | 2/1992 | ......... F16H 63/3483 |
| JP | H0620866 B2 * | 3/1994 | ......... F16H 63/3483 |

* cited by examiner

*Primary Examiner* — Bobby Rushing, Jr.
(74) *Attorney, Agent, or Firm* — Dority & Manning, P.A.

(57) ABSTRACT

A parking lock in a vehicle transmission includes a locking mechanism for locking and releasing a parking interlock gear (1) and an actuating unit. The actuating unit is coupled via a coupling mechanism to the locking mechanism in order to actuate the locking mechanism between an interlock position and a release position of the parking interlock gear (1). The parking lock is arranged on an intermediate plate (2) in a housing of the vehicle transmission.

7 Claims, 7 Drawing Sheets

ARRANGEMENT OF A PARKING LOCK IN A VEHICULAR TRANSMISSION

FIELD OF THE INVENTION

The present invention relates generally to an arrangement of a parking lock in a vehicle transmission.

BACKGROUND

A parking lock for a motor vehicle transmission is known, for example, from the publication DE 10 2016 101 486 A1. The parking lock includes a locking pawl for fixing an output shaft of a transmission, which is coupled to a parking interlock gear, in position, wherein this locking pawl is movable between an open position or a release position and an interlock position of the parking interlock gear with the aid of an actuating unit. The actuating unit is designed as a hydraulic cylinder arrangement which is coupled to a mechanical switch connected between the hydraulic cylinder arrangement and the locking mechanism. The hydraulic cylinder arrangement includes a cylinder and a piston which is axially displaceable in this cylinder and is coupled to the switch, wherein the switch is arranged in the cylinder. The piston is articulatedly connected to a connecting rod which, for its part, as an integral part of the actuating unit, mechanically acts on the locking pawl in order to engage and disengage the parking lock. The piston longitudinal axis of the hydraulic cylinder arrangement and the connecting rod are arranged axially parallel to one another, offset at a right angle with respect to a swivel axis of the locking pawl.

The parking lock is usually arranged in the transmission housing in the area of the hydraulic transmission control unit, since the parking lock cylinder or the hydraulic cylinder arrangement is located directly in the hydraulic control unit of the vehicle transmission. As a result, the necessary installation space for the control unit is enlarged. The structural design of the parking lock is established by the position of the parking lock cylinder in the hydraulic control unit, since the installation space available therefor is limited.

SUMMARY OF THE INVENTION

Example aspects of the present invention provide an arrangement of a parking lock in a vehicle transmission, which allows for a design which saves as much installation space as possible.

Accordingly, an arrangement of a parking lock in a vehicle transmission is provided, which includes a locking mechanism for locking and releasing a parking interlock gear, and an actuating unit, wherein the actuating unit is coupled via a coupling mechanism to the locking mechanism in order to actuate the locking mechanism between an interlock position and a release position of the parking interlock gear. In order to implement a particularly installation space-favorable design of the parking lock in the vehicle transmission, the parking lock is arranged on an intermediate plate in a housing of the vehicle transmission.

In this way, the parking lock is arranged in the intermediate plate of the vehicle transmission in an installation space-saving manner, separate from the hydraulic control unit. The intermediate plate is particularly suitable for accommodating the parking lock, since the intermediate plate already includes various functional surfaces, interfaces and connections, and bearing seats. Due to the additional accommodation of the parking lock, the functionality of the intermediate plate is expanded, whereby installation space can be saved at another point in the vehicle transmission.

Within the scope of an advantageous example embodiment of the invention, a parking lock cylinder of the actuating unit is arranged in a recess of the intermediate plate. The integration of the parking lock cylinder into the cylinder plate yields the advantage that the connection-related specifications of the intermediate plate, which are necessary for ensuring the seal of the oil ducts already present in the intermediate plate with respect to the adjacent housing parts, do not need to be modified for the control ducts of the parking lock cylinder which are now additionally provided in the intermediate plate, which positively influences the costs. These types of connection-related specifications are, for example, a specific surface finish of the intermediate plate and a specific contact pressure on the installed intermediate plate.

It is particularly advantageous when the locking mechanism and the coupling mechanism are provided in or on the intermediate plate, since this yields tolerance-related advantages due to particularly short actuating travel and, therefore, a short tolerance chain.

Due to the integration of the parking lock into the intermediate plate according to example aspects of the invention, a particularly installation space-favorable design for the arrangement results due to the fact, for example, that a longitudinal axis of the parking lock cylinder and a longitudinal axis of a guide rod of the locking mechanism as well as a swivel axis of a locking pawl of the parking interlock gear are arranged axially parallel to one another.

BRIEF DESCRIPTION OF THE DRAWINGS

The present invention is explained in greater detail in the following with reference to the drawings. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIGS. 1 through 7 show, by way of example, various views of a possible arrangement of a parking lock on an intermediate plate 2 of a vehicle transmission according to example aspects of the invention.

Within the scope of the arrangement of the parking lock according to example aspects of the invention, the parking lock includes a locking mechanism for locking and releasing a parking interlock gear 1, and an actuating unit. The actuating unit is coupled via a coupling mechanism to the locking mechanism in order to actuate the locking mechanism between an interlock position and a release position of the parking interlock gear 1. According to example aspects of the invention, the parking lock is arranged on the intermediate plate or intermediate wall 2 in a housing of the vehicle transmission, which is not represented in greater detail.

Figure 1:
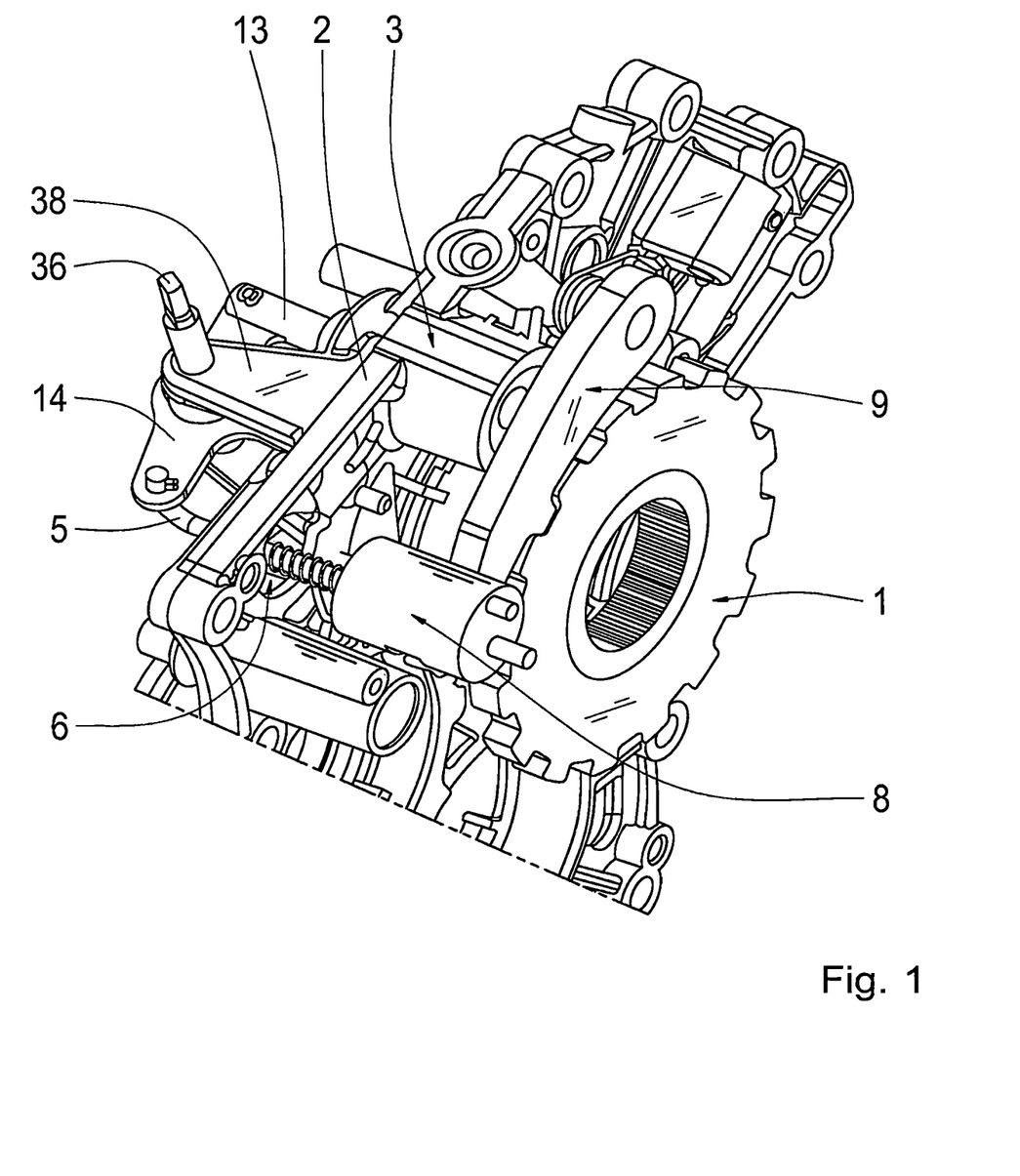
FIG. 1 shows a three-dimensional view of a possible embodiment variant of an arrangement of the parking lock on an intermediate plate of a vehicle transmission according to examples aspects of the invention.

It is apparent, in particular, from FIG. 1 that the actuating unit and the coupling mechanism are integrated into the intermediate plate 2. In this case, a parking lock cylinder 3 of the actuating unit is arranged in a recess 4 of the intermediate plate 2. A connecting rod 5 of the locking mechanism, which is hung in the coupling mechanism, extends through a passage opening 6 of the intermediate plate 2. An interlocking element 7 of the locking mechanism, which is axially movably mounted on the connecting rod 5, engages into a housing-affixed guide sleeve 8 in order to actuate a locking pawl 9 of the parking interlock gear 1.

Figure 2:
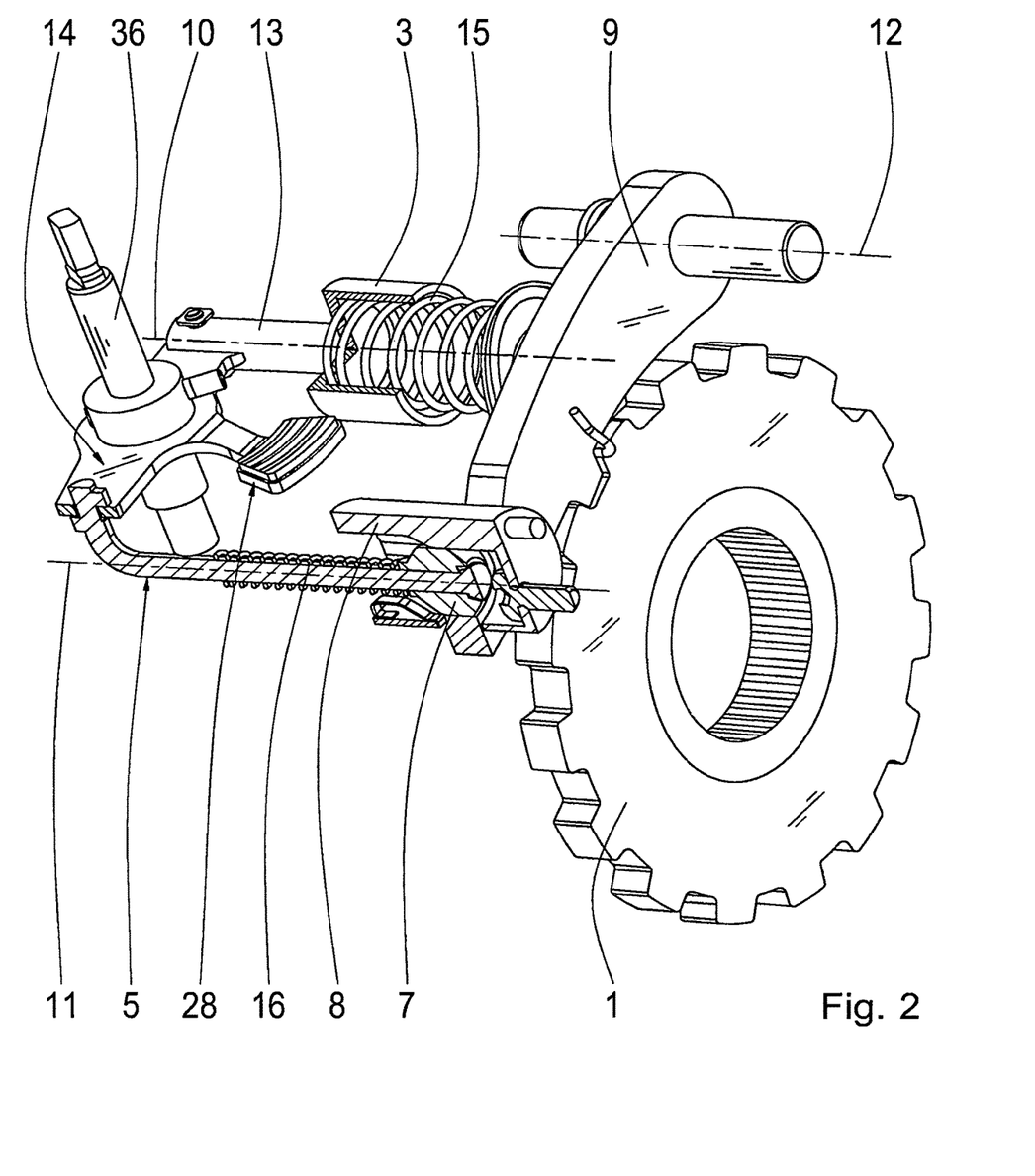
FIG. 2 shows a three-dimensional view of the parking lock.

FIG. 2 shows a representation of the parking lock including the actuating unit coupled to the locking mechanism with the aid of the coupling mechanism. It becomes apparent from FIG. 2 that a longitudinal axis 10 of the parking lock cylinder 3 and a longitudinal axis 11 of the connecting rod 5 of the locking mechanism extend approximately axially parallel to one another and are arranged approximately perpendicularly to the intermediate plate 2. In addition, the longitudinal axis 10 of the parking lock cylinder 3 and the longitudinal axis 11 of the connecting rod 5 are aligned approximately axially parallel to a swivel axis 12 of the locking pawl 9 of the parking interlock gear 1. Moreover, the guideway for the interlocking element 7 for actuating the locking pawl is indicated with the aid of the sectioning of the guide sleeve 8. For the purpose of actuating the connecting rod 5, a facing end of an actuating piston 13 of the parking lock cylinder 3 is coupled to one end of a two-sided lever or a swing fork 14, wherein the lever 14 is arranged on a selector shaft or control shaft 36 in a rotationally fixed manner. A facing end of the connecting rod 5 is attached to the other end of the two-sided lever 14. The selector shaft 36 is mounted on the intermediate plate 2 with the aid of holding straps 38 and is aligned approximately in parallel to the intermediate plate 2.

Due to the axial movement of the actuating piston 13 which is coupled to a spring 15 and is hydraulically actuated, the lever 14 is therefore moved, and so the connecting rod 5 is actuated via the lever 14 as the coupling mechanism. With the aid of a spring 16 concentrically enclosing the connecting rod 5, the interlocking element 7 is coupled to the guide rod 5, and so, upon engagement of the parking lock, the translatory motion of the actuating piston 13 results in a translatory motion of the interlocking element 7 until the locking pawl 9 actuated by the interlocking element 7 carries out a swiveling motion in order to lock the parking interlock gear 1. Upon disengagement of the parking lock, the translatory motion of the connecting rod 5 similarly follows the translatory motion of the actuating piston 13.

Figure 3:
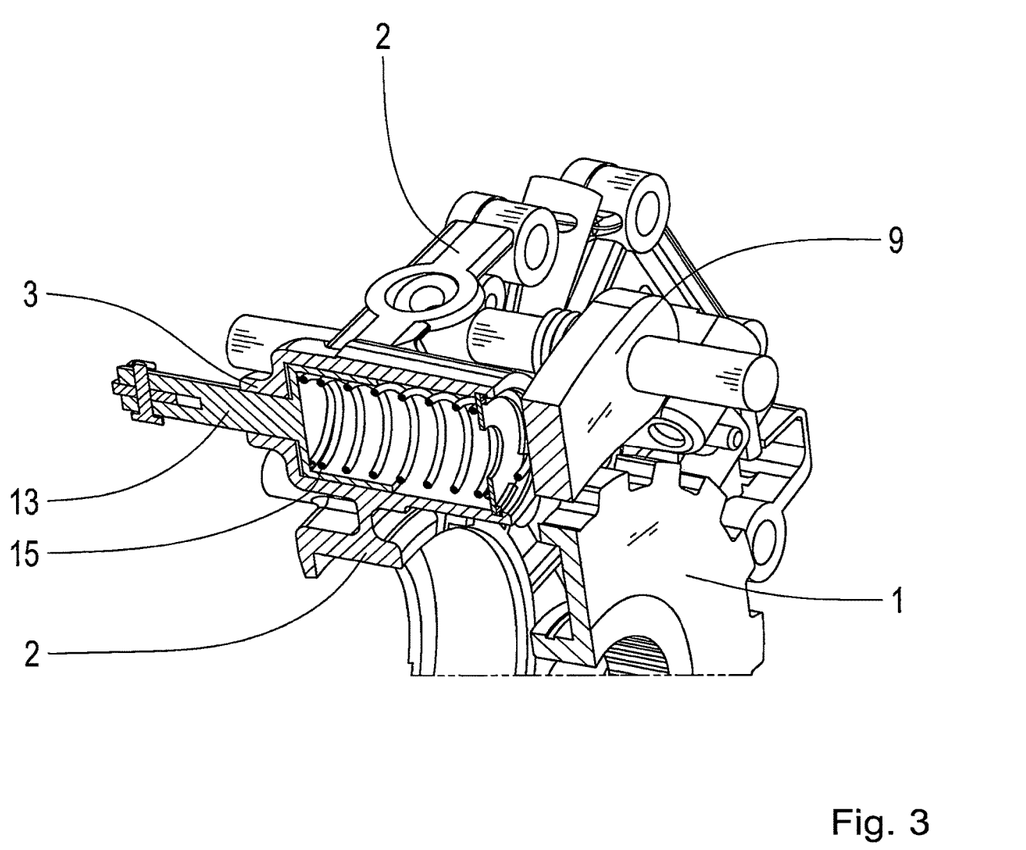
FIG. 3 shows a partially cut, three-dimensional detailed view of the parking lock on the intermediate plate.

FIG. 3 shows a cut detailed view of the parking lock cylinder 3, on the basis of which the structural configuration of the parking lock cylinder 3 held in the intermediate plate 2 is apparent.

Figure 4:
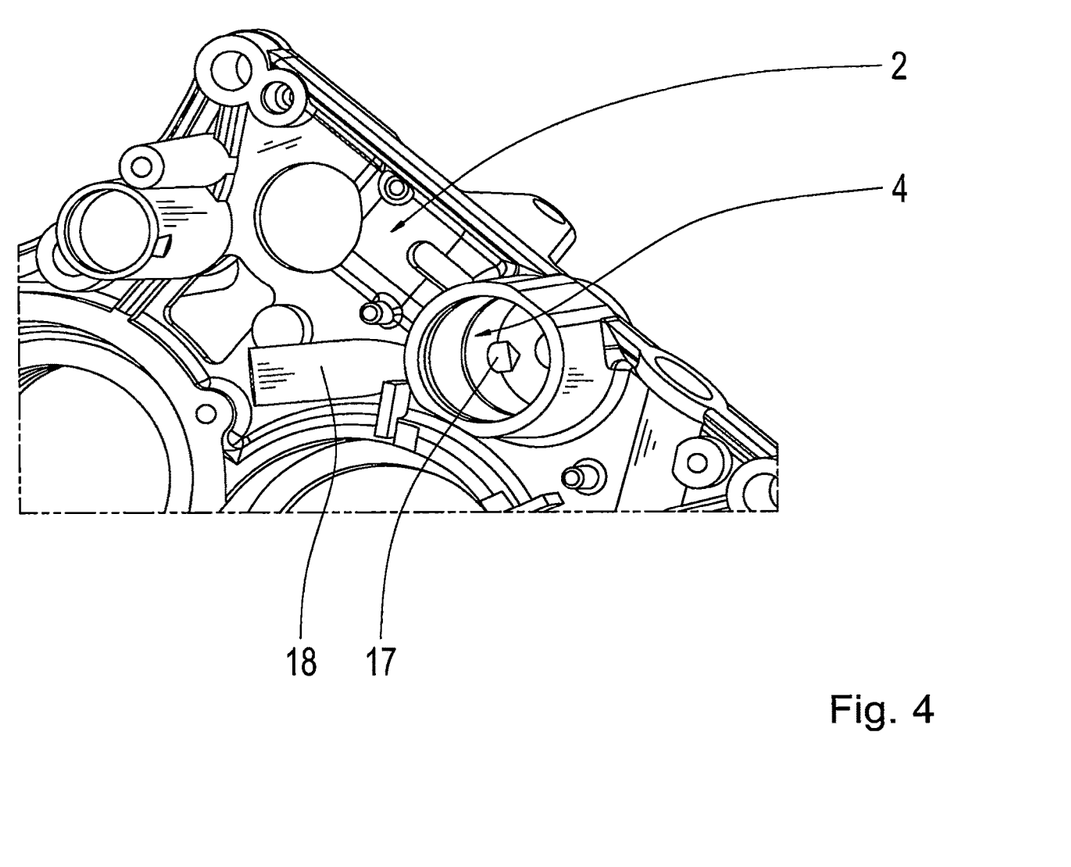
FIG. 4 shows a three-dimensional part view of the intermediate plate.

FIG. 4 shows the recess 4 of the intermediate plate 2, into which an oil delivery port 17 of an oil duct 18 leading into the parking lock cylinder 3 opens, with the aid of which the actuating pressure for the actuating piston 13 of the parking lock cylinder 3 is applied.

Figure 5:
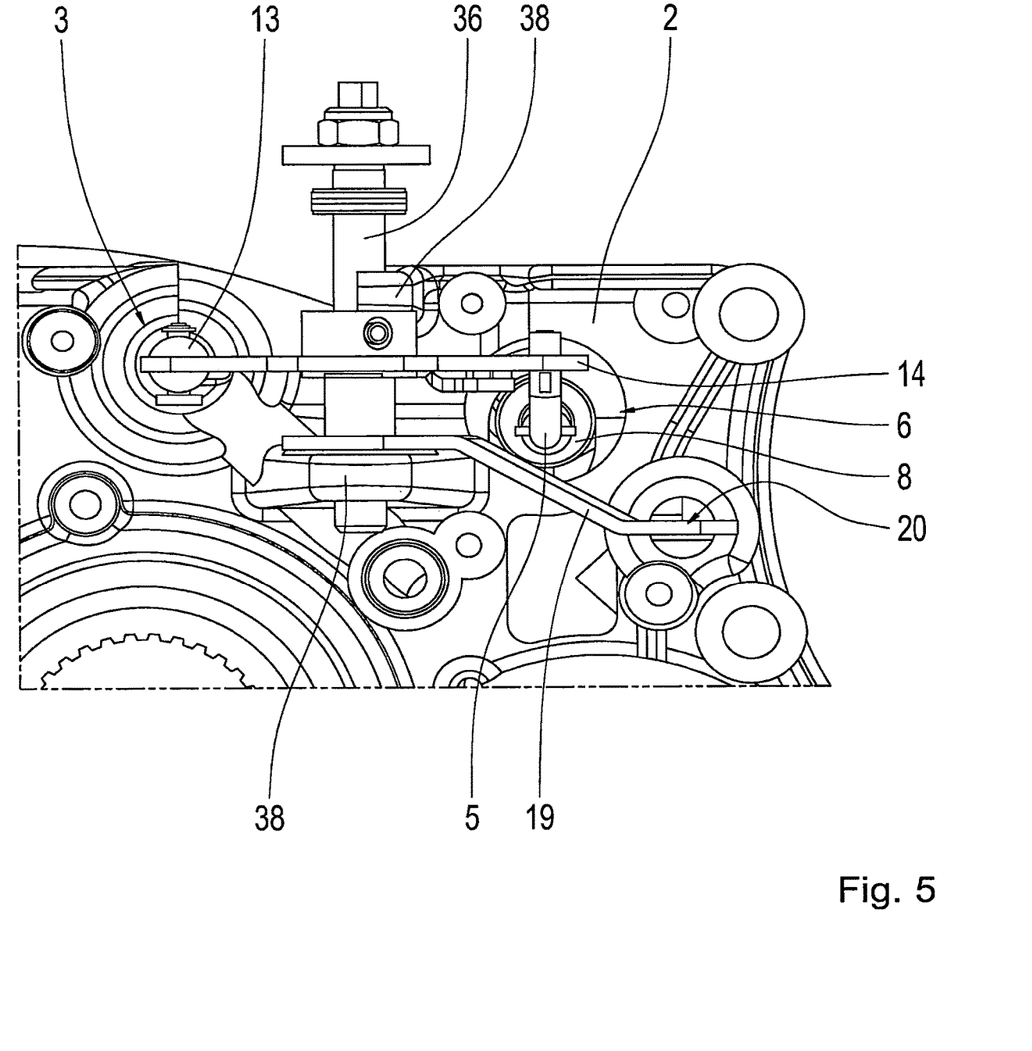
FIG. 5 shows a part view of the parking lock on the intermediate plate.

FIG. 5 shows a detailed view of the parking lock on the intermediate plate 2, on the basis of which a parking lock detent unit including a latch 20 on the intermediate plate 2 is apparent. The parking lock detent unit includes a one-sided lever 19 which is connected to the selector shaft 36 in a rotationally fixed manner. The end of the one-sided lever 19 is fixable in the intermediate plate-side latch 20 in order to fix a predetermined parking lock position.

Figure 6:
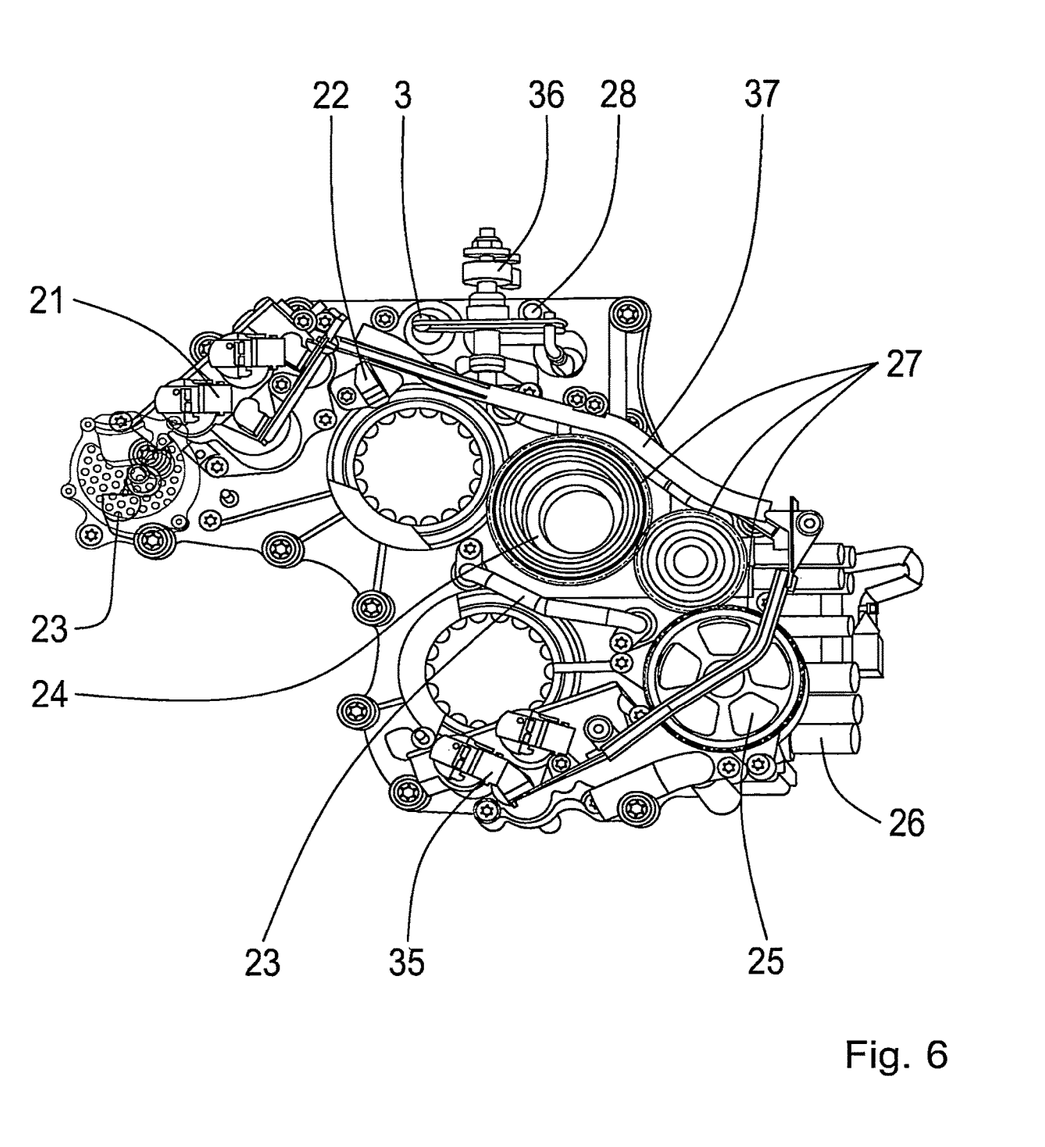
FIG. 6 shows a first side view of the intermediate plate including the parking lock and further functional surfaces, interfaces and connections, and bearing seats.
Figure 7:
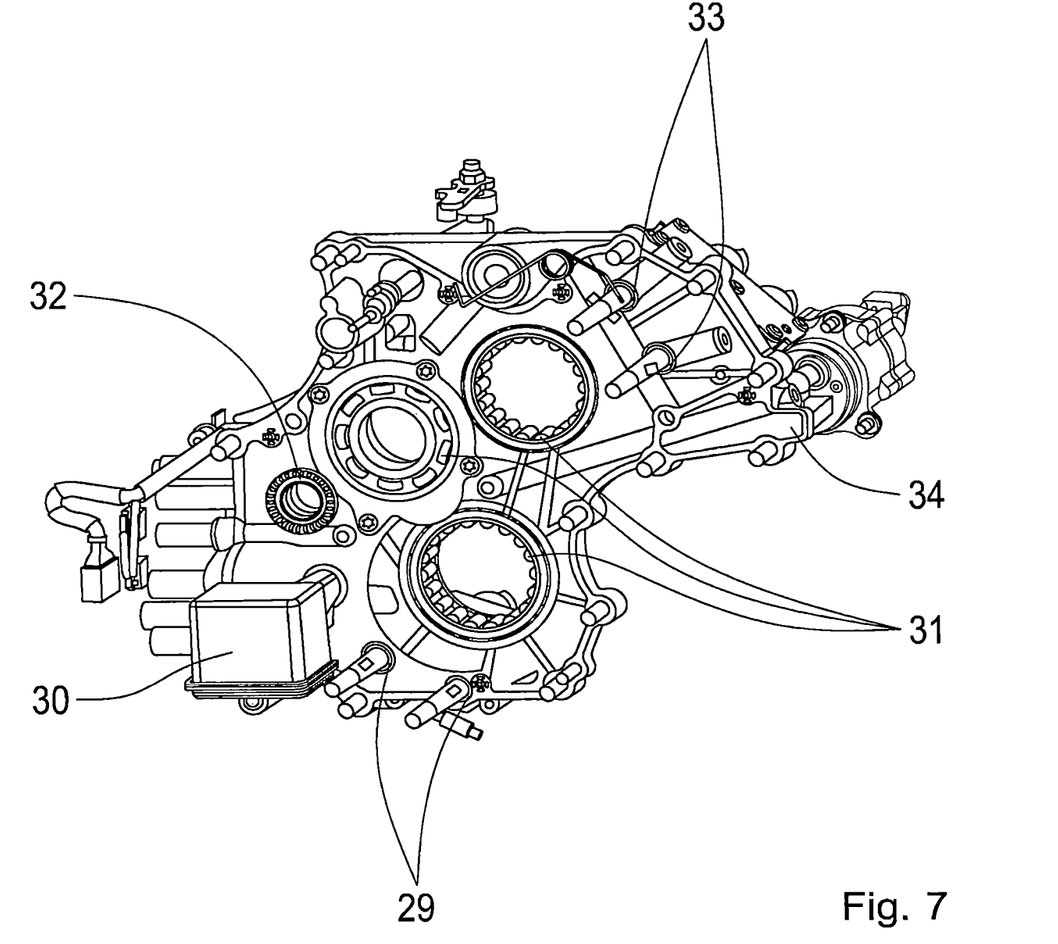
FIG. 7 shows a second side view of the intermediate plate including the parking lock and further functional surfaces, interfaces and connections, and bearing seats.

The side views according to FIGS. 6 and 7 each show the sides of the intermediate plate 2 including the further functional areas, interfaces and connections, and bearing seats.

In addition to the parking lock, for example, a gear change cylinder or valve block 21 of the vehicle transmission is represented in FIG. 6. Moreover, a speed sensor 22 is provided. With respect to the oil supply, an electric pump 23 including guides to the hydraulic control unit of the vehicle transmission is represented. In addition, an oil transfer 24 for clutch actuation and for cooling is provided in the intermediate plate 2. A further gear change cylinder or valve block 35 and a vane pump 25 are likewise mounted in the intermediate plate 2. In addition, further oil transfers 26 for the hydraulic control unit are provided. Moreover, a pump drive 27 as well as a parking lock sensor 28 for sensing the parking lock positions are provided and are rotationally fixed to the selector shaft 36. Finally, a cable harness 37 for connection to sensors and valve blocks is installed on the intermediate plate 2.

Gear shift rod bearings 29 and a filter 30 for the suction loading are apparent, in particular, from FIG. 7. Moreover, at least three bearing seats 31 for the gear set are provided in the intermediate plate 2. A further bearing seat 32 is provided in the intermediate plate 2 for a central system pump. Finally, a further gear shift rod bearing 33 and an oil collecting channel 34 for lubricating the gear set are provided on the intermediate plate 2.

Modifications and variations can be made to the embodiments illustrated or described herein without departing from the scope and spirit of the invention as set forth in the appended claims.

REFERENCE CHARACTERS

1 parking interlock gear
2 intermediate plate or intermediate wall
3 parking lock cylinder
4 recess of the intermediate plate
5 connecting rod
6 passage opening of the intermediate plate
7 interlocking element
8 guide sleeve
9 locking pawl
10 longitudinal axis of the parking lock cylinder
11 longitudinal axis of the guide rod
12 swivel axis of the parking interlock gear
13 actuating piston
14 two-sided lever or swing fork
15 spring
16 spring
17 oil delivery port
18 oil duct
19 one-sided lever 20 latch
21 gear change cylinder or valve block
22 speed sensor
23 electric pump
24 oil transfer for clutch actuation
25 sliding vane pump
26 oil transfers
27 pump drive
28 parking lock sensor
29 gear shift rod bearing
30 filter
31 bearing seats for the gear set
32 bearing seat for the system pump
33 gear shift rod bearing
34 oil collecting channel
35 gear change cylinder or valve block
36 selector shaft or control shaft
37 cable harness
38 holding strap

The invention claimed is:

1. An arrangement of a parking lock in a vehicle transmission, wherein the parking lock comprises:
  a locking mechanism for locking and releasing a parking interlock gear (1); and
  an actuating unit coupled to the locking mechanism via a coupling mechanism in order to actuate the locking mechanism between an interlock position and a release position of the parking interlock gear (1),
  wherein the parking lock is arranged on an intermediate plate (2) in a housing of the vehicle transmission,
  wherein a parking lock cylinder (3) of the actuating unit is arranged in a recess (4) of the intermediate plate (2),
  wherein a connecting rod (5) of the locking mechanism extends through a passage opening (6) of the intermediate plate (2),
  wherein the connecting rod (5) engages into a housing-affixed guide sleeve (8) with an interlocking element (7) in order to actuate a locking pawl (9) of the parking interlock gear (1),
  wherein the interlocking element (7) is axially movably mounted on the connecting rod (5), and
  wherein a longitudinal axis (10) of the parking lock cylinder (3) and a longitudinal axis (11) of the connecting rod (5) of the locking mechanism extend approximately axially parallel to each other and are aligned approximately perpendicularly to the intermediate plate (2).

2. An arrangement of a parking lock in a vehicle transmission, wherein the parking lock comprises:
  a locking mechanism for locking and releasing a parking interlock gear (1); and
  an actuating unit coupled to the locking mechanism via a coupling mechanism in order to actuate the locking mechanism between an interlock position and a release position of the parking interlock gear (1),
  wherein the parking lock is arranged on an intermediate plate (2) in a housing of the vehicle transmission,
  wherein a parking lock cylinder (3) of the actuating unit is arranged in a recess (4) of the intermediate plate (2),
  wherein a connecting rod (5) of the locking mechanism extends through a passage opening (6) of the intermediate plate (2),
  wherein the connecting rod (5) engages into a housing-affixed guide sleeve (8) with an interlocking element (7) in order to actuate a locking pawl (9) of the parking interlock gear (1),
  wherein the interlocking element (7) is axially movably mounted on the connecting rod (5), and
  wherein a longitudinal axis (10) of the parking lock cylinder (3) and a longitudinal axis (11) of the connecting rod (5) extend approximately axially parallel to a swivel axis (12) of the locking pawl (9) of the parking interlock gear (1).

3. An arrangement of a parking lock in a vehicle transmission, wherein the parking lock comprises:
  a locking mechanism for locking and releasing a parking interlock gear (1); and
  an actuating unit coupled to the locking mechanism via a coupling mechanism in order to actuate the locking mechanism between an interlock position and a release position of the parking interlock gear (1),
  wherein the parking lock is arranged on an intermediate plate (2) in a housing of the vehicle transmission,
  wherein a parking lock cylinder (3) of the actuating unit is arranged in a recess (4) of the intermediate plate (2),
  wherein a connecting rod (5) of the locking mechanism extends through a passage opening (6) of the intermediate plate (2),
  wherein the connecting rod (5) engages into a housing-affixed guide sleeve (8) with an interlocking element (7) in order to actuate a locking pawl (9) of the parking interlock gear (1),
  wherein the interlocking element (7) is axially movably mounted on the connecting rod (5),
  wherein an end of an actuating piston (13) of the parking lock cylinder (3) is coupled to a first end of a two-sided lever (14) of the coupling mechanism arranged on a selector shaft (36) of the coupling mechanism, and
  wherein an end of the connecting rod (5) is coupled to a second end of the two-sided lever (14) of the coupling mechanism.

4. The arrangement of claim 3, wherein the selector shaft (36) is aligned approximately parallel to the intermediate plate (2) and is mounted to the intermediate plate (2) with holding straps (38).

5. The arrangement of claim 3, wherein the parking lock cylinder (3) is connected to an oil duct (18) in the intermediate plate (2) for actuating the actuating piston (13), and the oil duct (18) opens into the parking lock cylinder (3) via an oil delivery port (17).

6. The arrangement of claim 3, wherein a parking lock detent unit is provided with an intermediate plate-side latch (20) on the intermediate plate (2).

7. The arrangement of claim 6, wherein the parking lock detent unit comprises a one-sided lever (19) connected to the selector shaft (36) in a rotationally fixed manner, and the end of the one-sided lever (19) is fixable in the intermediate plate-side latch (20) in order to fix a predetermined parking lock position.

* * * * *